United States Patent
Zaleski et al.

(10) Patent No.: US 6,637,840 B2
(45) Date of Patent: Oct. 28, 2003

(54) TRACK SUPPORT ELEMENT FOR TIRE ENGAGING TRACK

(76) Inventors: Tom Zaleski, 11808 - 135 Street, Edmonton, Alberta (CA), T5L 1W6; Mark Leslie Middleton, 880 Nottingham Blvd., Sherwood Park, Alberta (CA), T8A 5V2

( * ) Notice: Subject to any disclaimer, the term of this patent is extended or adjusted under 35 U.S.C. 154(b) by 0 days.

(21) Appl. No.: 10/011,044

(22) Filed: Nov. 9, 2001

(65) Prior Publication Data

US 2002/0053831 A1 May 9, 2002

(30) Foreign Application Priority Data

Nov. 9, 2000 (CA) .............................................. 2325315

(51) Int. Cl.[7] .............................................. B62D 55/18
(52) U.S. Cl. ........................ 305/193; 305/181; 305/185; 152/187; 152/225 R
(58) Field of Search .................. 305/185, 191, 305/193, 195, 196, 198, 200, 201, 19, 165, 159, 160, 161, 180, 181; 152/170, 185, 225 R, 179, 182, 183, 185.1

(56) References Cited

U.S. PATENT DOCUMENTS

| | | | |
|---|---|---|---|
| 2,821,443 A | * 1/1958 | Galanot | |
| 2,917,095 A | * 12/1959 | Galanot | |
| 3,497,271 A | * 2/1970 | Keller | |
| 3,610,708 A | 10/1971 | Muecke | 305/35 EB |
| 3,724,580 A | 4/1973 | Adams, Jr. | 180/9.2 R |
| 3,733,107 A | 5/1973 | Cote et al. | 305/10 |
| 3,756,668 A | 9/1973 | Russ, Sr. | 305/35 EB |
| 3,776,326 A | * 12/1973 | Davin et al. | |
| 4,099,794 A | * 7/1978 | Hoffart | |
| 4,281,882 A | * 8/1981 | Van Der Lely | |
| 4,351,380 A | 9/1982 | Pilliod et al. | 152/169 |
| 4,810,043 A | 3/1989 | McIntosh | 305/15 |
| 4,813,466 A | 3/1989 | Forsyth et al. | 152/179 |
| 4,844,562 A | * 7/1989 | Ranner | |
| 5,246,246 A | 9/1993 | Kendall | 280/677 |
| 5,284,387 A | 2/1994 | Loegering | 305/56 |
| 5,361,860 A | 11/1994 | Smith et al. | 180/9.21 |
| 5,616,193 A | * 4/1997 | Nordstrom et al. | 152/185.1 |
| 5,671,819 A | 9/1997 | Kendall | 180/9.1 |
| 5,707,123 A | 1/1998 | Grob | 305/169 |
| 5,951,124 A | * 9/1999 | Hoffart | 305/111 |

FOREIGN PATENT DOCUMENTS

| | | | |
|---|---|---|---|
| CA | 969221 | 6/1975 | 305/53 |
| CA | 1042490 | 11/1978 | 305/30 |
| CA | 1053730 | 5/1979 | 305/64 |
| CA | 1161477 | 1/1984 | 305/49 |
| CA | 1256474 | 6/1989 | 305/30 |

* cited by examiner

*Primary Examiner*—Russell D. Stormer
(74) *Attorney, Agent, or Firm*—Christensen O'Connor Johnson Kindness PLLC

(57) ABSTRACT

A track support element includes an elongate body. A first tire containment member is positioned along the elongate body. A second tire containment member is positioned along the elongate body in spaced relation to the first tire containment member. Either the first tire containment member, the second tire containment member or both are movable along the elongate body whereby the relative distance between the first tire containment member and the second tire containment member is adjustable to accommodate vehicular tires having differing widths.

12 Claims, 5 Drawing Sheets

TRACK SUPPORT ELEMENT FOR TIRE ENGAGING TRACK

FIELD OF THE INVENTION

The present invention relates to a track support element for a tire engaging track.

BACKGROUND OF THE INVENTION

Endless tracks are used to convert motor vehicles that normally run on rubber tires for use in winter weather. Track support elements support the track and engage the tires of the motor vehicle. Examples of track support elements are disclosed in U.S. Pat. Nos. 4,099,794; 4,810,043 and 5,284,387. Each of the above described United States Patents disclose a track support element that has an elongate unitary body with upstanding tire containment members at each end. These track support elements are designed to fit only one of the plurality of sizes of vehicular tires.

SUMMARY OF THE INVENTION

What is required is a track support element that can be adapted to fit several of the plurality of sizes of vehicular tires.

According to the present invention there is provided a track support element which includes an elongate body. A first tire containment member is positioned along the elongate body. A second tire containment member is positioned along the elongate body in spaced relation to the first tire containment member. Either the first tire containment member, the second tire containment member or both are movable along the elongate body whereby the relative distance between the first tire containment member and the second tire containment member.

The track support element, as described above, is readily adjustable to fit different sizes of vehicular tire. It would be possible to secure the first tire containment member and the second tire containment member directly to a rubber track. However, the use of an elongate body has been found to provide considerable benefits. It provides extra strength to the tire containment members so that they do not become detached from the track. It does this by distributing the force exerted upon each of the tire containment members over a larger surface area. It stabilizes the tire containment members during rotation of the track by resisting twisting of the tire containment members. When the elongate body is in a transverse orientation, it provides an extra gripping surface which helps prevent tires from spinning. Although beneficial results may be obtained through the use of the invention, as described above, even more beneficial results may be obtained when additional selected features are added, as will hereinafter be further described.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
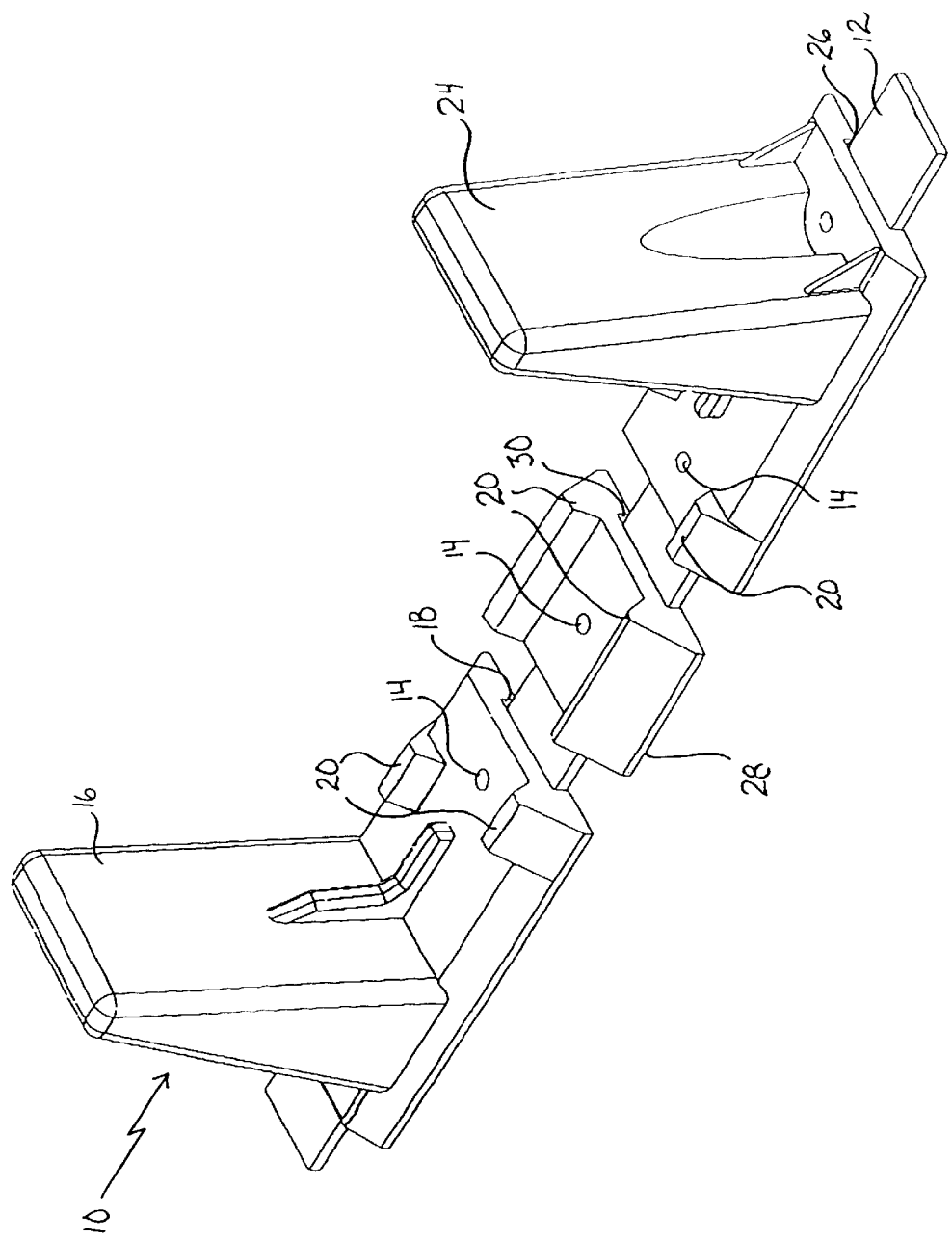
FIG. 1 is perspective view of a track support element constructed in accordance with the teachings of the present invention.

The preferred embodiment, a track support element generally identified by reference numeral 10, will now be described with reference to FIGS. 1 through 4.

Structure and Relationship of Parts

Referring to FIG. 1, there is provide a track support element 10 which has an elongate strip 12 with a plurality of fastener receiving openings 14. A first tire containment member 16 is positioned along elongate strip 12. First tire containment member 16 has a first receiving channel 18 in which elongate strip 12 is received. First tire containment member 16 also has fastener receiving opening 14 which is shielded by raised puncture shields 20 thereby shielding tires from being punctured by a fastener 22 extending through fastener receiving opening 14. A second tire containment member 24 is positioned along elongate strip 12 in spaced relation to first tire containment member 16. Second tire containment member 24 has a second receiving channel 26 in which elongate strip 12 is received. Second tire containment member 24 also has a fastener receiving opening 14 that is shielded by raised puncture shields 20 thereby shielding tires from being punctured by fastener 22 extending through fastener receiving opening 14. First tire containment member 16 and second tire containment member 24 are both made from a polymer plastic material.

Both first tire containment member 16 and second tire containment member 24 are movable along elongate strip 12 whereby the relative distance between first tire containment member 16 and second tire containment member 24 is adjustable to accommodate vehicular tires having differing widths. For large spans, it is preferred that an intermediate member 28 be provided between first tire containment member 16 and second tire containment member 24. Intermediate member 28 has a receiving channel 30 in which elongate strip 12 is received and fastener receiving opening 14 shielded by raised puncture shields 20 thereby shielding tires from being punctured by fastener 22 extending through fastener receiving opening 14. Intermediate member 28 secures elongate strip more securely to the endless track and provides an intermediate gripping surface.

Operation

Figure 2:
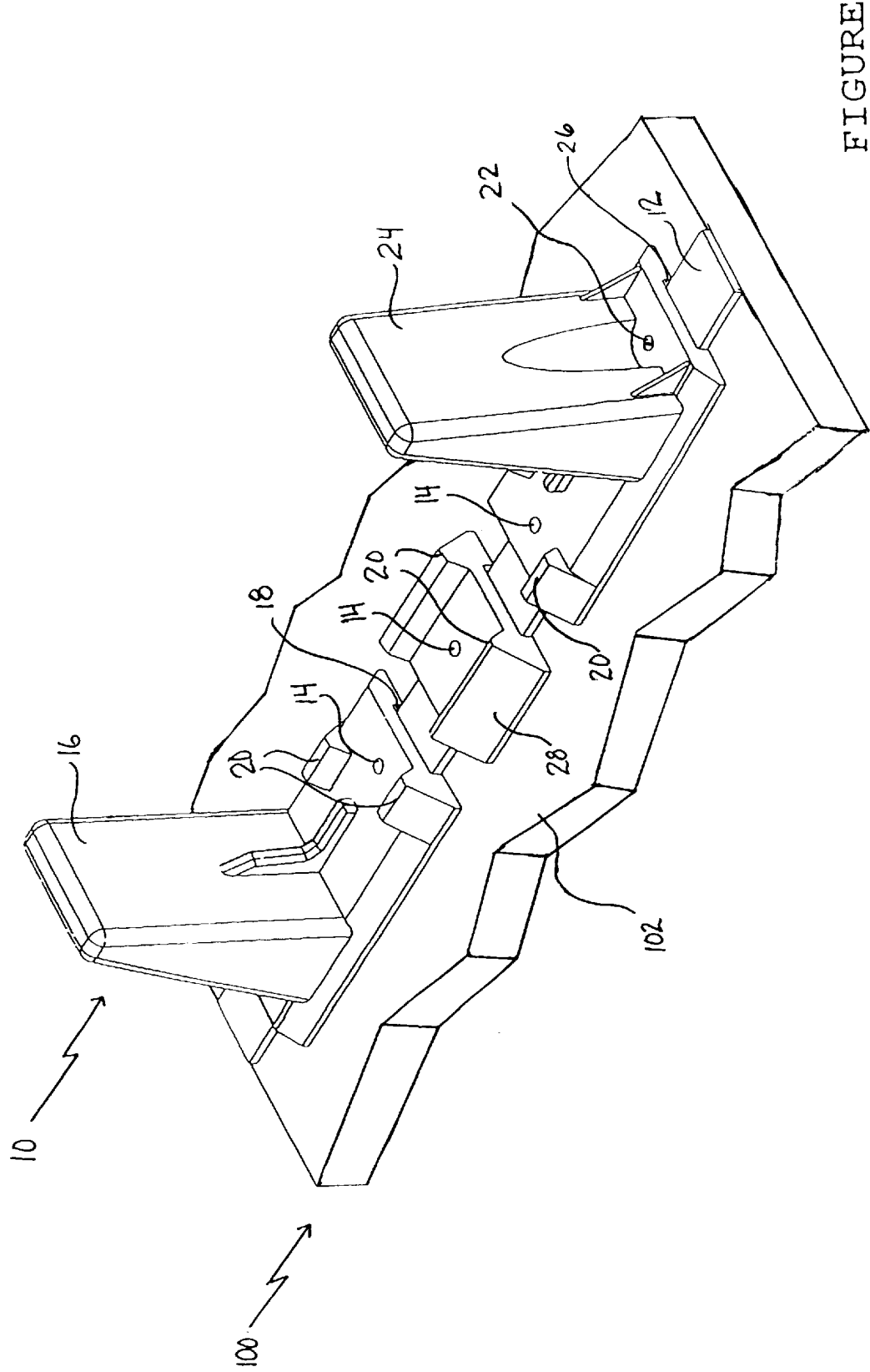
FIG. 2 is a perspective view of the track support element illustrated in FIG. 1, incorporated into a track.

The use and operation of track support element 10 will now be described with reference to FIGS. 1 through 4. Referring to FIG. 2, numerous track support elements 10 are secured in spaced relation to endless belt track 100. Track 100 includes a flexible wear resistant substrate 102 such that track 100 can be molded around a tire. Each track support element 10 is secured to flexible substrate 102 of track 100 with first tire containment member 16 and second tire containment member 24 spaced along elongate strip 12 an appropriate distance to accommodate the width of tire. During installation elongate strip 12 is positioned on flexible substrate 102. First receiving channel 18 of first tire containment member 16 and second receiving channel 26 of second tire containment member 24 are then engaged with elongate strip 12. The distance between first tire containment member 16 and second tire containment member 24 is then adjusted. Intermediate member 28 is added to provide additional support and an additional gripping surface if the span between first tire containment member 16 and second tire containment member 24 is sufficient to accommodate intermediate member 28. When first tire containment member 16 and second tire containment member 24 have been adjusted to the proper width, a fastener 22 such as a bolt is then inserted through fastener receiving openings 14 of first tire containment member 16 and second tire containment member 24 and through underlying elongate strip 12 to secure them to flexible substrate 102 of track 100.

The use of elongate strip 12 has been found to provide considerable benefits such as providing extra strength to first tire containment member 16 and second tire containment member 24 so that they do not become detached from flexible substrate 102 of track 100. The forces exerted upon either of the tire containment members are distributed along elongate strip 12. The engagement of elongate strip 12 with first receiving channel 18 and second receiving channel 26 helps resist twisting of the tire containment members. Furthermore, elongate strip 12 stabilizes first tire containment member 16 and second tire containment member 24 during rotation of track 100 as well as providing an extra gripping surface which helps prevent tires from spinning.

Alternative Embodiments

Figure 3:
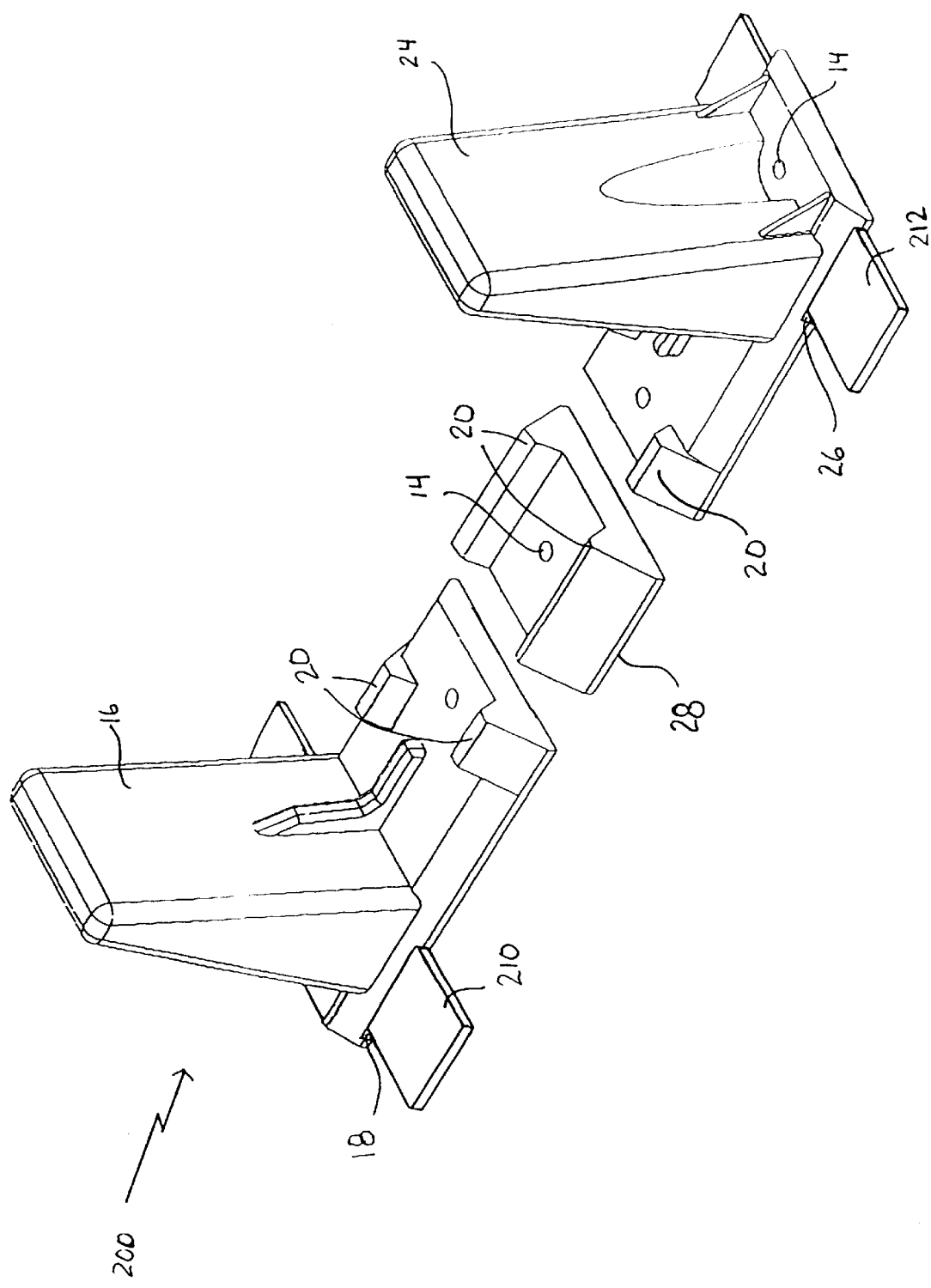
FIG. 3 is a perspective view of the track support element illustrated in FIG. 1, incorporated into a track in a different orientation.

Referring to FIG. 3, there is illustrated an alternative embodiment of track support element generally referenced by numeral 200. In the alternative embodiment 200, a first elongate strip 210 is positioned so as to extend lengthwise with first tire containment member 16. First receiving channel 18 also extends lengthwise with first tire member 16 so as to receive first elongate strip 210. Second tire containment member 24 is secured to a second elongate strip 212 which is positioned parallel to first elongate strip 210 and extends lengthwise with second containment member 24. Second receiving channel 26 also extends lengthwise with second tire member 24 so as to receive second elongate strip 212. Fasteners 22 such as bolts are used to secure first tire containment member 16 along with first elongate strip 210 and second tire containment member 24 along with second elongate strip 212 to endless belt track 100.

In alternative embodiment of track support element 200, first elongate strip 210 and second elongate strip 212 provide additional stability to first tire containment member 16 and second containment member 24 by distributing the force exerted on first tire containment member 16 and second containment member 24 over a larger surface area during use. First elongate strip 210 and second elongate strip 212 also provide extra strength to first tire containment member 16 and second containment member 24 so as to reduce the possibility that first tire containment member 16 or second tire containment member 24 will twist or detach from flexible substrate 102 during use.

In alternative embodiment 200, first tire containment member 16 and second containment member 24 operate in the same manner as in first embodiment 10, however first embodiment of track support element 10 is preferable to alternative embodiment 200 as first tire containment member 16 and second tire containment member 24 are not movable along first elongate strip 210 and second elongate strip 212 in second embodiment 200. Furthermore, with alternative embodiment 200, the lengthwise positioning of first elongate strip 210 and second elongate strip 212 does not provide the additional gripping surface for tires as is provided with the widthwise positioning of elongate strip 12 in first embodiment 10.

Figure 4:
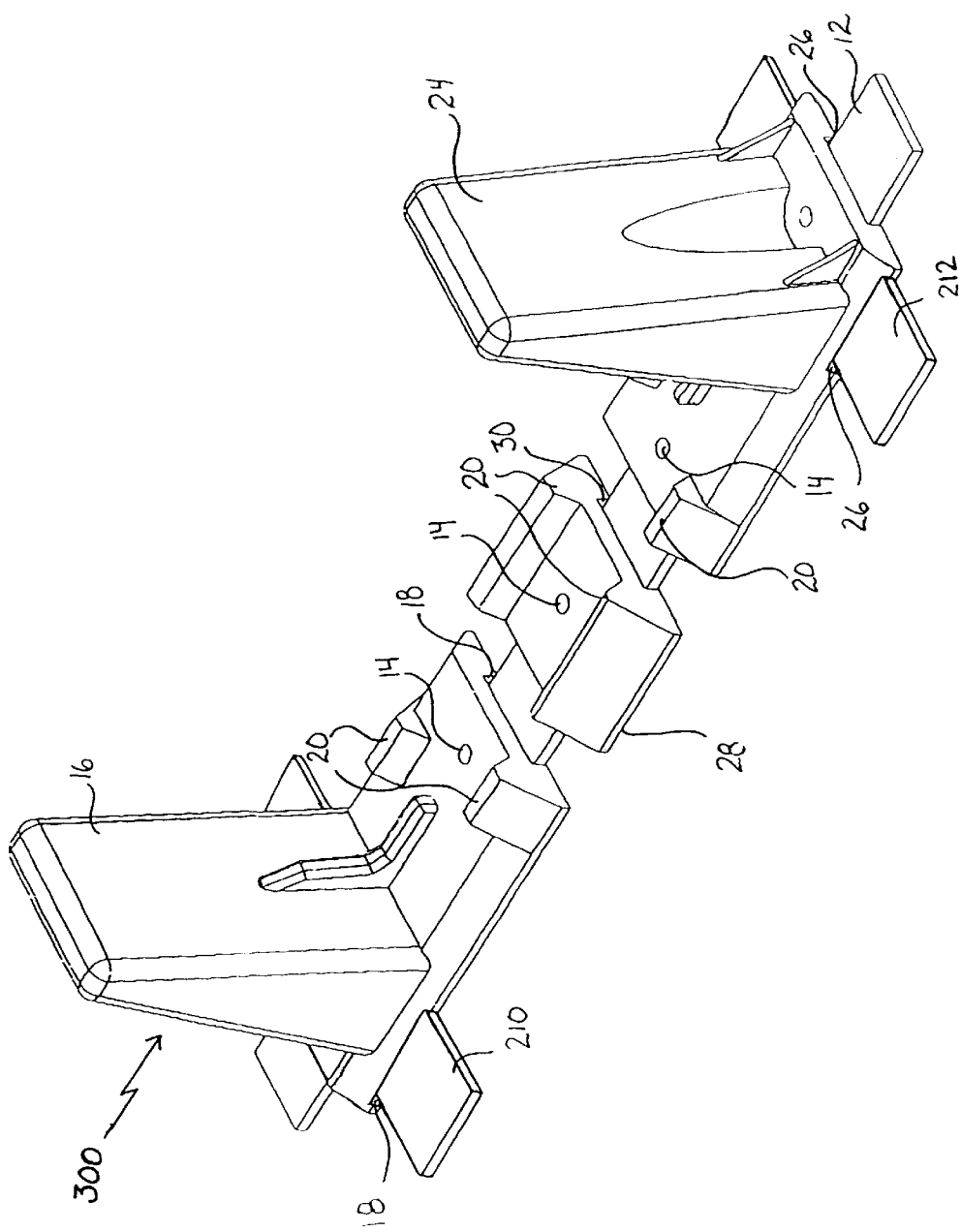
FIG. 4 is a perspective view of the track support element illustrated in FIG. 1, incorporated into a track in two orientations.

Referring to FIG. 4, there is illustrated a further alternative embodiment of track support element generally referenced by numeral 300. The illustrated embodiment 300 incorporates elongate strip 12 as well as first elongate strip 210 and second elongate strip 212. With illustrated embodiment 300, elongate strip 12 is positioned widthwise between first tire containment member 16 and second tire containment member 24 in the manner illustrated in FIG. 1 while first elongate strip 210 and second elongate strip 212 are positioned lengthwise in the manner illustrated in FIG. 3. Alternative embodiment 300 operates in the same fashion as described for first embodiment 10 and alternative embodiment 200.

Figure 5:
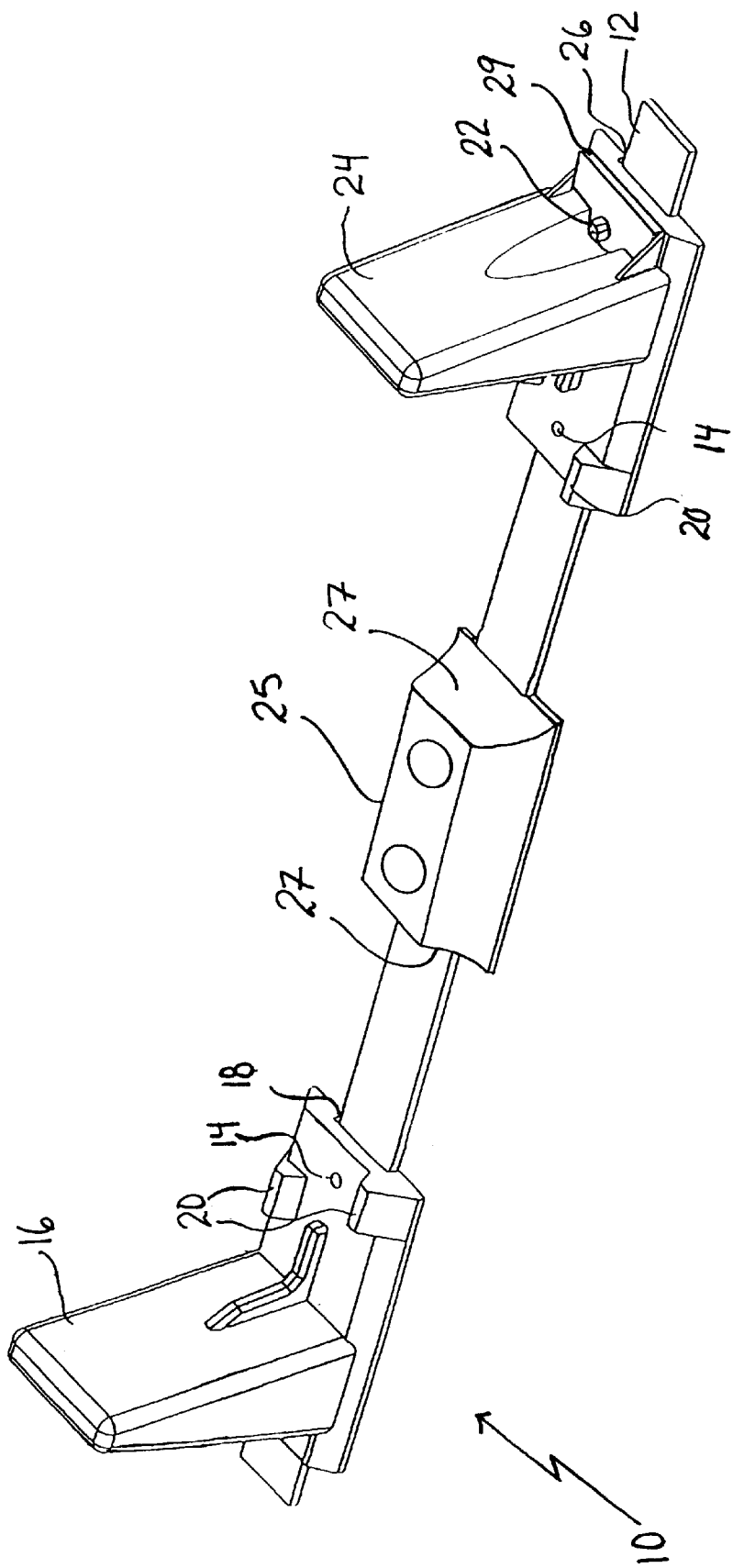
FIG. 5 is a perspective view of the track support element illustrated in FIG. 1, with a guide added thereto.

Referring to FIG. 5, there is illustrated a further alternative embodiment with a guide 25 having raised contoured guide surfaces 27 positioned between the tire containment members 16 and 24 of the track sport element 10. Furthermore, washers 29 have been added between the fasteners 22 and the tire containment members 16 and 24.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A track support element, comprising:
   at least one elongate body;
   a first tire containment member secured to the at least one elongate body;
   a second tire containment member secured to the at least one elongate body in spaced relation to the first tire containment member; and
   at least one of the first tire containment member and the second tire containment member is movable along the at least one elongate body whereby the relative distance between the first tire containment member and the second tire containment member is adjustable to accommodate vehicular tires having differing widths.

2. The track support element as defined in claim 1, wherein the first tire containment member has a receiving channel in which the at least one elongate body is received.

3. The track support element as defined in claim 1, wherein the first tire containment member and the at least one elongate body both have at least one fastener receiving opening adapted to receive fasteners.

4. The track support element as defined in claim 3, wherein the at least one fastener receiving opening of the first tire containment member has shields whereby tires are shielded from being punctured by a fastener extending through the fastener receiving opening.

5. The track support element as defined in claim 1, wherein the first tire containment member is made form a polymer plastic material.

6. The track support element as defined in claim 1, wherein at least one intermediate member is provided between the first tire containment member and the second tire containment member.

7. A track support element, comprising:
- a single elongate strip having a plurality of fastener receiving openings;
- a first tire containment member positioned along the single elongate strip, the first tire containment member having first receiving channel in which the single elongate strip is received and at least one fastener receiving opening shielded by raised puncture shields thereby shielding tires from being punctured by a fastener extending through the at least one fastener receiving opening; and
- a second tire containment member positioned along the single elongate strip in spaced relation to the first tire containment member, the second tire containment member having a second receiving channel in which the single elongate strip is received and at least one fastener receiving opening shielded by raised puncture shields thereby shielding tires from being punctured by a fastener extending through the at least one fastener receiving opening;
- in which both the first tire containment member and the second tire containment member are movable along the single elongate strip whereby the relative distance between the first tire containment member d the second tire containment member is adjustable to accommodate vehicular tires having differing widths.

8. The track support element as defined in claim 7, wherein the first tire containment member and the second tire containment member are both made from a polymer plastic material.

9. The track support element as defined in claim 7, wherein at least one intermediate member is provided between the first tire containment member and the second tire containment member, the at least one intermediate member having a receiving channel in which the single elongate strip is received and at least one fastener receiving opening shielded by raised puncture shields thereby shielding tires from being punctured by a fastener extending through the at least one fastener receiving opening.

10. A track, comprising:
- a flexible wear resistant substrate; and
- a plurality of track support elements secured in spaced relation to the flexible wear resistant substrate, each of the track support elements being comprised of:
  - a single elongate strip having a plurality of fastener receiving openings;
  - a first tire containment member positioned along the single elongate strip, the first tire containment member having a first receiving channel in which the elongate strip is received and fastener receiving openings, fasteners securing the first tire containment member and the single elongate strip to the flexible wear resistant substrate, the fastener receiving openings being shielded by raised puncture shields thereby shielding tires from being punctured by the fasteners extending through the fastener receiving openings; and
  - a second tire containment member positioned along the single elongate strip in spaced relation to the first ire containment member, the second tire containment member having a second receiving channel in which the single elongate strip is received and fastener receiving openings, fasteners securing the second tire containment member and the elongate strip to the flexible wear resistant subs rate, the fastener receiving openings being shielded by raised puncture shields thereby shielding tires from being punctured by fasteners extending through the fastener receiving openings;
  - in which both the first tire containment member and the second tire containment member are selectively positionable along the elongate strip whereby the relative distance between the first tire containment ember and the second tire containment member is adjustable to accommodate vehicular tires having differing widths.

11. The track as defining claim 10, wherein the first tire containment member and the second tire containment member are both made from a polymer plastic material.

12. The track as defined in claim 10, wherein an intermediate member is provided between the first tire containment member and the second tire containment member, the intermediate member having a receiving channel in which the single elongate strip is received and fastener receiving openings shielded by raised puncture shields thereby shielding tires from being punctured by fasteners extending through the fastener receiving openings.

* * * * *

UNITED STATES PATENT AND TRADEMARK OFFICE
CERTIFICATE OF CORRECTION

PATENT NO.    : 6,637,840 B2
DATED         : October 28, 2003
INVENTOR(S)   : T . Zaleski et al.

It is certified that error appears in the above-identified patent and that said Letters Patent is hereby corrected as shown below:

Column 5,
Line 8, "having first" should read -- having a first --
Line 27, "member d the" should read -- member and the --

Column 6,
Line 17, "ire" should read -- tire --
Line 23, "subs rate," should read -- substrate, --
Line 32, "ember" should read -- member --
Line 35, "as defining" should read -- as defined in --

Signed and Sealed this

Tenth Day of February, 2004

JON W. DUDAS
*Acting Director of the United States Patent and Trademark Office*